US012661748B2

(12) United States Patent
Chen et al.

(10) Patent No.: US 12,661,748 B2
(45) Date of Patent: Jun. 23, 2026

(54) HIGH-SPEED NUT ROTATING FEEDING LEAD SCREW DEVICE

(71) Applicant: KEDE NUMERICAL CONTROL CO., LTD., Dalian (CN)

(72) Inventors: Yufeng Chen, Dalian (CN); Yanbo Hou, Dalian (CN); Changlin Du, Dalian (CN); Zhihui Ren, Dalian (CN); Mingshan Song, Dalian (CN); Chungang Cai, Dalian (CN); Chunhong Fan, Dalian (CN); Cuijuan Guo, Dalian (CN); Lianyang Wang, Dalian (CN); Yapeng Li, Dalian (CN); Xingjian He, Dalian (CN); Xinglin Gong, Dalian (CN); Wenlu Bao, Dalian (CN)

(73) Assignee: KEDE NUMERICAL CONTROL CO., LTD., Dalian (CN)

( * ) Notice: Subject to any disclaimer, the term of this patent is extended or adjusted under 35 U.S.C. 154(b) by 0 days.

(21) Appl. No.: 18/857,857

(22) PCT Filed: Dec. 6, 2022

(86) PCT No.: PCT/CN2022/136817
§ 371 (c)(1),
(2) Date: Oct. 18, 2024

(87) PCT Pub. No.: WO2023/202086
PCT Pub. Date: Oct. 26, 2023

(65) Prior Publication Data
US 2025/0114891 A1 Apr. 10, 2025

(30) Foreign Application Priority Data
Apr. 20, 2022 (CN) .......................... 202210463927.3

(51) Int. Cl.
B23Q 5/40 (2006.01)
B23Q 11/12 (2006.01)
(Continued)

(52) U.S. Cl.
CPC ............. B23Q 5/402 (2013.01); B23Q 5/404 (2013.01); B23Q 5/408 (2013.01)

(58) Field of Classification Search
CPC ......... B23Q 5/402; B23Q 5/404; B23Q 5/408
See application file for complete search history.

(56) References Cited

U.S. PATENT DOCUMENTS 3,041,640 A * 7/1962 Renoux .................... B23G 1/04
82/110
3,105,397 A * 10/1963 Hayden .................. B23Q 5/402
74/89.31
(Continued)

FOREIGN PATENT DOCUMENTS

CN 201902522 U 7/2011
CN 202462082 U 10/2012
(Continued)

*Primary Examiner* — Lucas E. A. Palmer
(74) *Attorney, Agent, or Firm* — MUNCY, GEISSLER, OLDS & LOWE, P.C.

(57) ABSTRACT

A high-speed nut rotation feed ball screw device includes a ball screw, a ball screw nut, a bearing unit, and a driving unit. The ball screw is fixed on a machine tool via a ball screw seat. The bearing unit includes an inner bearing fixing sleeve, an outer bearing fixing sleeve, and a bearing assembly. One end of the inner bearing fixing sleeve is fixedly connected to one end of the ball screw nut, and another end is fixedly connected to the driving unit. The ball screw nut is arranged on the ball screw. The driving unit includes a first pulley, a second pulley, a synchronous belt, and a driving motor. The first pulley is connected to the driving motor. The second pulley is sleeved on the ball screw and is connected (Continued)

to the inner bearing fixing sleeve. The first and second pulleys are connected via the synchronous belt.

7 Claims, 2 Drawing Sheets

(51) Int. Cl.
*F16H 25/20* (2006.01)
*F16H 25/22* (2006.01)
*F16H 57/04* (2010.01)

(56) References Cited

U.S. PATENT DOCUMENTS

| | | | | |
|---|---|---|---|---|
| 4,573,566 A * | 3/1986 | Roman | B23Q 11/04 | |
| | | | | 269/61 |
| 5,127,281 A * | 7/1992 | Yanawgisawa | F16H 25/2018 | |
| | | | | 74/89.38 |
| 5,145,041 A * | 9/1992 | Hirai | B23Q 5/402 | |
| | | | | 477/185 |
| 5,327,795 A * | 7/1994 | Katahira | B23Q 5/402 | |
| | | | | 74/89.3 |
| 9,248,529 B2 * | 2/2016 | Watanabe | B23P 11/00 | |
| 9,399,288 B2 * | 7/2016 | Peng | H02K 41/02 | |
| 2005/0204798 A1 * | 9/2005 | Imaeda | F16H 25/2018 | |
| | | | | 72/443 |
| 2009/0245955 A1 * | 10/2009 | Maillard | B23Q 5/326 | |
| | | | | 173/13 |
| 2009/0311059 A1 * | 12/2009 | Janson | B23B 47/34 | |
| | | | | 408/126 |
| 2010/0119316 A1 * | 5/2010 | Galand | B23Q 11/1015 | |
| | | | | 408/1 R |
| 2014/0238711 A1 * | 8/2014 | Myhill | B23Q 5/265 | |
| | | | | 173/1 |
| 2015/0375306 A1 * | 12/2015 | Jallageas | B23Q 5/326 | |
| | | | | 408/67 |
| 2017/0274488 A1 * | 9/2017 | Watford | B23Q 5/326 | |
| 2019/0118323 A1 * | 4/2019 | Koshiishi | B23Q 11/1015 | |

FOREIGN PATENT DOCUMENTS

| | | | | |
|---|---|---|---|---|
| CN | 206493160 U | * | 9/2017 | |
| CN | 109826916 A | * | 5/2019 | |
| CN | 114633140 A | | 6/2022 | |
| CN | 217317105 U | | 8/2022 | |
| JP | H11294554 A | | 10/1999 | |

* cited by examiner

HIGH-SPEED NUT ROTATING FEEDING LEAD SCREW DEVICE

TECHNICAL FIELD

The present invention relates to the technical field of feed drive of numerical control machine tools, specifically to a high-speed nut rotation feed ball screw device.

BACKGROUND ART

In the field of numerical control machine tools, a ball screw driving device is a commonly used design structure, especially for a feed movement of a slide or spindle of a machine tool. However, existing ball screw driving devices generally adopt a driving motor connected to a ball screw. The driving motor drives the ball screw to rotate, and a ball screw nut is fixedly connected to a moving part. As the ball screw rotates, the ball screw drives the ball screw nut to move in a straight line, thereby driving the moving part. Existing ball screw driving devices have the following shortcomings. Due to the large size and mass of the ball screw, its inertia is also large. Thus, a high-power driving motor is needed to drive the ball screw to rotate, increasing the overall size and cost of the driving device. Additionally, existing ball screw driving devices require a bearing unit to be sleeved outside the ball screw nut, increasing the radial size of the ball screw nut assembly and consequently increasing the overall size of the ball screw driving device. Furthermore, since the bearing unit is sleeved outside the ball screw nut, the heat generated between the ball screw nut and the ball screw is not easily dissipated, affecting the performance and service life of the ball screw nut.

SUMMARY OF INVENTION

To solve the above problems, the present invention proposes a high-speed nut rotation feed ball screw device.

The technical means adopted by the present invention are as follows.

A high-speed nut rotation feed ball screw device includes: a ball screw; a ball screw nut; a bearing unit; and a driving unit, the ball screw is fixed on a machine tool via a ball screw seat, the bearing unit includes an inner bearing fixing sleeve, an outer bearing fixing sleeve, and a bearing assembly, the outer bearing fixing sleeve is sleeved on the inner bearing fixing sleeve, a bearing installation space is formed between the outer bearing fixing sleeve and the inner bearing fixing sleeve, the bearing assembly is installed in the bearing installation space, one end of the inner bearing fixing sleeve is a ball screw nut connection end for fixedly connecting to one end of the ball screw nut, and another end of the inner bearing fixing sleeve is a driving unit connection end for fixedly connecting to the driving unit, the ball screw nut is arranged on the ball screw, and one end of the ball screw nut is fixedly connected to the ball screw nut connection end of the inner bearing fixing sleeve, the driving unit includes a first pulley, a second pulley, a synchronous belt, and a driving motor, the first pulley is connected to the driving motor, the second pulley is sleeved on the ball screw and is fixedly connected to the driving unit connection end of the inner bearing fixing sleeve, and the first pulley and the second pulley are connected via the synchronous belt.

Further, a bearing seal ring is provided between the inner bearing fixing sleeve and the outer bearing fixing sleeve at one end close to the ball screw nut connection end.

Further, an oil injection channel communicating with the bearing seal ring is provided on the outer bearing fixing sleeve.

Further, a torque limiter is provided between the driving motor and the first pulley.

Further, the bearing assembly includes two sets of angular contact ball bearings arranged symmetrically, each set including at least one angular contact ball bearing.

Further, the inner bearing fixing sleeve has a stepped shaft sleeve structure, an external thread is provided at one end of the inner bearing fixing sleeve close to the driving unit connection end, and the bearing assembly is fixed on the inner bearing fixing sleeve via a locking nut.

Further, the high-speed nut rotation feed ball screw device includes a gland, and the gland is fixedly connected respectively to, via screws, one end of a slide close to the driving unit connection end and one end of the outer bearing fixing sleeve close to the driving unit connection end.

Further, a cooling channel is provided in the ball screw and is arranged axially along the ball screw.

Compared with the prior art, the high-speed nut rotation feed ball screw device according to the present invention has the following advantageous effects. The ball screw device according to the present invention directly drives the ball screw nut to rotate through the driving unit, thereby driving the slide to move via the ball screw nut. Due to the small size, light weight, and low inertia of the ball screw nut, a low-power driving motor can be used for driving, reducing the size and cost of the device. Additionally, due to the low inertia of the entire device, high-speed rotation feed of the ball screw nut can be achieved. Furthermore, since the ball screw nut and the bearing unit are arranged axially along the ball screw, the overall radial size of the ball screw nut and the bearing unit is reduced, further decreasing the size of the ball screw device. Additionally, since the ball screw nut and the bearing unit are arranged axially along the ball screw, heat dissipation is facilitated, improving the performance and service life of the ball screw.

Figure 1:
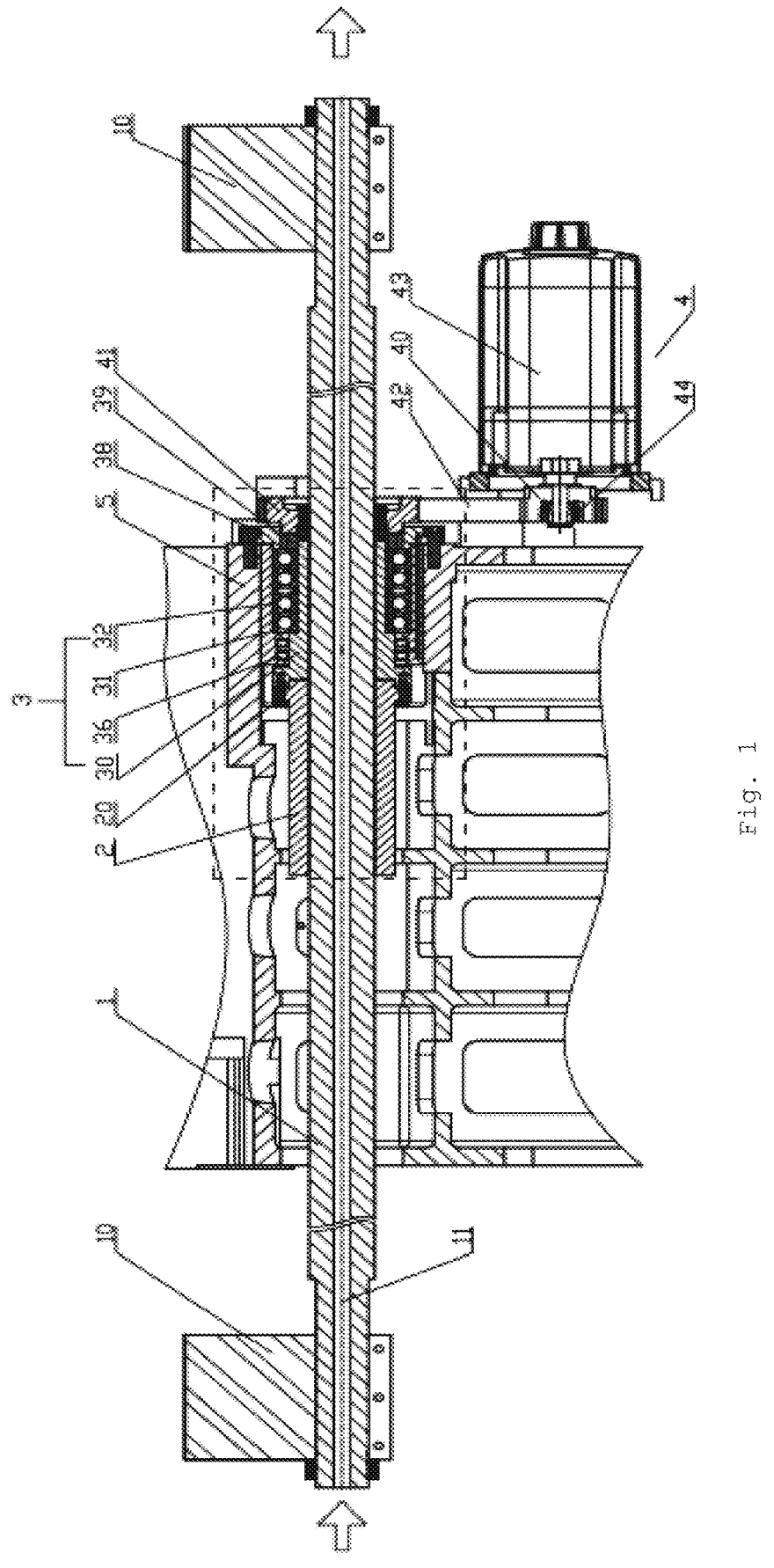
FIG. 1 is a structural diagram of a high-speed nut rotation feed ball screw device according to the present invention.

In the drawings: 1. ball screw, 10. ball screw seat, 11. cooling channel, 2. ball screw nut, 20. ball screw nut connection flange, 3. bearing unit, 30. inner bearing fixing sleeve, 300. inner bearing fixing sleeve connection flange, 31. outer bearing fixing sleeve, 32. bearing assembly, 33. bearing installation space, 34. ball screw nut connection end, 35. driving unit connection end, 36. bearing seal ring, 37. oil injection channel, 38. gland, 39. locking nut, 4. driving unit, 40. first pulley, 41. second pulley, 42. synchronous belt, 43. driving motor, 44. torque limiter

DESCRIPTION OF EMBODIMENTS

Figure 2:
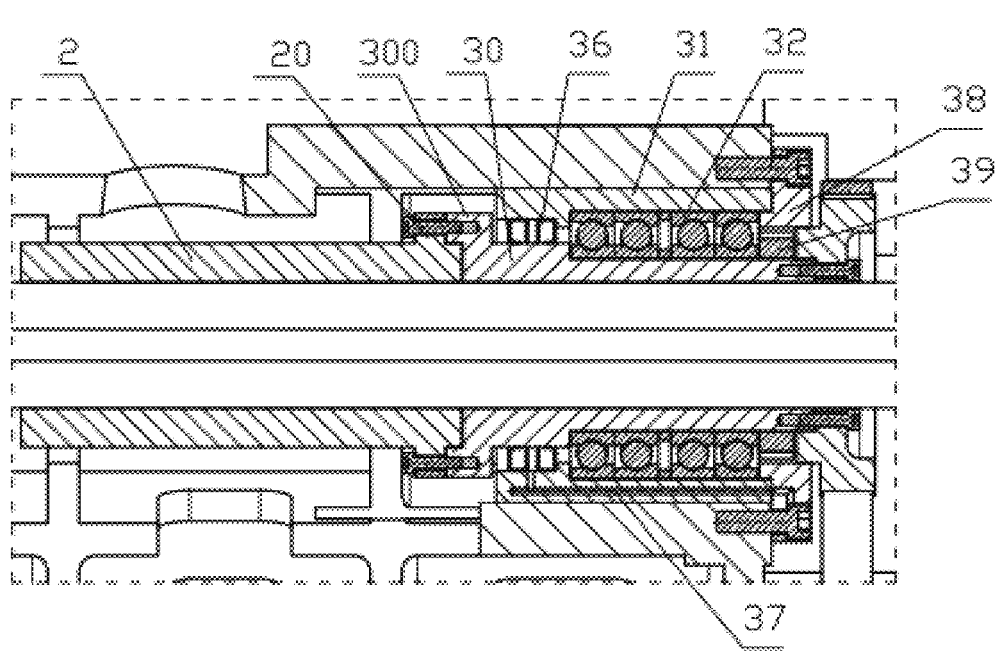
FIG. 2 is a partial enlarged schematic view of a dotted box in FIG. 1.

As shown in FIGS. 1 and 2, the high-speed nut rotation feed ball screw device according to the present invention includes a ball screw 1, a ball screw nut 2, a bearing unit 3, and a driving unit 4.

Both ends of the ball screw 1 are fixed on a machine tool via a ball screw seats 10.

The bearing unit 3 includes an inner bearing fixing sleeve 30, an outer bearing fixing sleeve 31, and a bearing assembly 32, the outer bearing fixing sleeve 31 is sleeved on the inner bearing fixing sleeve 30, a bearing installation space 33 is formed between the outer bearing fixing sleeve 31 and the inner bearing fixing sleeve 30, the bearing assembly 32 is installed in the bearing installation space 33, one end of the inner bearing fixing sleeve 30 is a ball screw nut connection end 34 for fixedly connecting to one end of the ball screw nut 2, and another end of the inner bearing fixing sleeve 30 is a driving unit connection end 35 for fixedly connecting to the driving unit 4.

The ball screw nut 2 is arranged on the ball screw 1, and one end of the ball screw nut 2 is fixedly connected to the ball screw nut connection end 34 of the inner bearing fixing sleeve 30, and preferably, standard ball screw structures are used for the ball screw and the ball screw nut to facilitate procurement, thereby reducing the design and manufacturing costs of the machine tool.

The driving unit 4 includes a first pulley 40, a second pulley 41, a synchronous belt 42, and a driving motor 43, the first pulley 40 is connected to the driving motor 43, the second pulley 41 is sleeved on the ball screw 1 and is fixedly connected to the driving unit connection end 35 of the inner bearing fixing sleeve 30, and the first pulley 40 and the second pulley 41 are connected via the synchronous belt 42. In the present embodiment, a servo motor is used as the driving motor.

Specifically, one end of the ball screw nut 2 facing the bearing unit 3 is provided with a ball screw nut connection flange 20. The inner bearing fixing sleeve 30 has a stepped shaft sleeve structure. An external thread is provided at one end of the inner bearing fixing sleeve 30 close to the driving unit connection end 35. The bearing assembly 32 is fixed on the inner bearing fixing sleeve 30 via a locking nut 39, which abuts an inner ring of the bearing to limit the bearing on the inner bearing fixing sleeve. An end of the inner bearing fixing sleeve 30 facing the ball screw nut 2 is provided with an inner bearing fixing sleeve connection flange 300. The ball screw nut connection flange 20 is fixedly connected to the inner bearing fixing sleeve connection flange 300 via screws. The end of the inner bearing fixing sleeve 30 with the locking nut is also provided with a gland 38. The gland 38 is fixedly connected respectively to one end of a slide 5 close to the driving unit connection end and one end of the outer bearing fixing sleeve 31 close to the driving unit connection end via screws. The gland abuts one end of the outer ring of the bearing to limit the inner ring of the bearing in the outer bearing fixing sleeve. The second pulley 41 has a through hole in the middle. The second pulley is sleeved on the ball screw through the through hole and is fixedly connected to the inner bearing fixing sleeve via screws.

The ball screw device according to the present invention directly drives the ball screw nut to rotate through the driving unit, thereby driving the slide to move via the ball screw nut. Due to the small size, light weight, and low inertia of the ball screw nut, a low-power driving motor can be used for driving, reducing the size and cost of the device. Additionally, due to the low inertia of the entire device, high-speed rotation feed of the ball screw nut can be achieved. Furthermore, since the ball screw nut and the bearing unit are arranged axially along the ball screw, the overall radial size of the ball screw nut and the bearing unit is reduced, allowing for the use of bearings with smaller diameters especially, further reducing rotational inertia and consequently decreasing the size of the ball screw device. Additionally, since the ball screw nut and the bearing unit are arranged axially along the ball screw, the ball screw nut is fully exposed, facilitating heat dissipation for the ball screw nut and improving the performance and service life of the ball screw. Furthermore, as the ball screw nut is connected through the bearing unit and both ends of the ball screw are fixed, the ball screw essentially has three support points. The driving force applied by the driving unit is close to the ball screw nut, which enhances the rigidity of the ball screw, allowing for high-speed rotation of the ball screw nut and significantly increasing the safe rotational speed between the ball screw and the ball screw nut. This further improves the motion performance of the machine tool.

Further, a bearing seal ring 36 is provided between the inner bearing fixing sleeve 30 and the outer bearing fixing sleeve 31 at one end close to the ball screw nut connection end 34. An oil injection channel 37 communicating with the bearing seal ring 36 is provided on the outer bearing fixing sleeve 31. Due to the presence of the bearing seal ring structure and the oil injection channel, the sealing of the bearing assembly can be achieved, ensuring the performance of the bearing and consequently ensuring the performance of the entire ball screw device, thus improving its service life.

Further, a torque limiter 44 is provided between the driving motor 43 and the first pulley 40. Due to the presence of the torque limiter, in the event of an overload caused by a collision of the machine tool or other reasons, the torque limiter slips to protect the driving unit from damage.

Further, the bearing assembly 32 includes two sets of angular contact ball bearings arranged symmetrically, each set including at least one angular contact ball bearing. In the present embodiment, each set has two angular contact ball bearings, and the two sets of angular contact ball bearings are separated by a spacer ring. The use of angular contact ball bearings allows the bearing assembly 32 to withstand both the axial forces generated between the ball screw and the ball screw nut and the radial forces generated by the driving motor through the synchronous belt, ensuring the performance between the ball screw nut and the ball screw and improving their service life. Preferably, angular contact ball bearings with a pressure angle of 60 degrees are used.

Further, a cooling channel 11 is provided in the ball screw 1 and is arranged axially along the ball screw. Specifically, the cooling channel is machined through the center of the ball screw in the axial direction, extending through both ends of the ball screw. By injecting a coolant into the cooling channel, with the arrows in the drawing indicating the flow direction of the coolant, the temperature of the ball screw and the ball screw nut can be further reduced, ensuring the performance and service life of the ball screw and the ball screw nut.

The above description is only a preferred embodiment of the present invention, but the protection scope of the present invention is not limited to this. Any equivalent replacements or changes made by a person skilled in the art within the technical scope disclosed by the present invention according to the technical solution of the present invention and the inventive concept thereof should be within the protection scope of the present invention.

The invention claimed is:

1. A high-speed nut rotation feed ball screw device, comprising:
   a ball screw;
   a ball screw nut;
   a bearing unit; and
   a driving unit, wherein the ball screw is fixed on a machine tool via a ball screw seat, the bearing unit includes an inner bearing fixing sleeve, an outer bearing fixing sleeve, and a bearing assembly, the outer bearing fixing sleeve is sleeved on the inner bearing fixing sleeve, a bearing installation space is formed between the outer bearing fixing sleeve and the inner bearing fixing sleeve, the bearing assembly is installed in the bearing installation space, one end of the inner bearing fixing sleeve is a ball screw nut connection end for fixedly connecting to one end of the ball screw nut, and another end of the inner bearing fixing sleeve is a driving unit connection end for fixedly connecting to the driving unit, the ball screw nut is arranged on the ball screw, and one end of the ball screw nut is fixedly connected to the ball screw nut connection end of the inner bearing fixing sleeve, and the driving unit includes a first pulley, a second pulley, a synchronous belt, and a driving motor, the first pulley is connected to the driving motor, the second pulley is sleeved on the ball screw and is fixedly connected to the driving unit connection end of the inner bearing fixing sleeve, and the first pulley and the second pulley are connected via the synchronous belt;

wherein an oil injection channel communicating with the bearing seal ring is provided on the outer bearing fixing sleeve.

2. The high-speed nut rotation feed ball screw device according to claim 1, wherein a bearing seal ring is provided between the inner bearing fixing sleeve and the outer bearing fixing sleeve at one end close to the ball screw nut connection end.

3. The high-speed nut rotation feed ball screw device according to claim 1, wherein a torque limiter is provided between the driving motor and the first pulley.

4. The high-speed nut rotation feed ball screw device according to claim 3, wherein the bearing assembly includes two sets of angular contact ball bearings arranged symmetrically, each set including at least one angular contact ball bearing.

5. The high-speed nut rotation feed ball screw device according to claim 1, wherein the inner bearing fixing sleeve has a stepped shaft sleeve structure, an external thread is provided at one end of the inner bearing fixing sleeve close to the driving unit connection end, and the bearing assembly is fixed on the inner bearing fixing sleeve via a locking nut.

6. The high-speed nut rotation feed ball screw device according to claim 5, further comprising a gland that is fixedly connected respectively to, via screws, one end of a slide close to the driving unit connection end and one end of the outer bearing fixing sleeve close to the driving unit connection end.

7. The high-speed nut rotation feed ball screw device according to claim 1, wherein a cooling channel is provided in the ball screw and is arranged axially along the ball screw.

* * * * *